US008886492B2

(12) United States Patent
Wener

(10) Patent No.: US 8,886,492 B2
(45) Date of Patent: Nov. 11, 2014

(54) DIGITAL ANGLE METER

(75) Inventor: James Wener, Chicago, IL (US)

(73) Assignee: Brown Line Metal Works, LLC

( * ) Notice: Subject to any disclaimer, the term of this patent is extended or adjusted under 35 U.S.C. 154(b) by 367 days.

(21) Appl. No.: 13/241,660

(22) Filed: Sep. 23, 2011

(65) Prior Publication Data

US 2013/0080110 A1 Mar. 28, 2013

(51) Int. Cl.

| | |
|---|---|
| ***G01C 9/00*** | (2006.01) |
| ***B25B 13/00*** | (2006.01) |
| ***G01L 3/00*** | (2006.01) |
| ***B25B 23/142*** | (2006.01) |

(52) U.S. Cl.

CPC .................................. *B25B 23/1425* (2013.01)

USPC ........................... 702/151; 81/52; 73/862.334

(58) Field of Classification Search

USPC ............. 702/151, 33, 41, 127, 150, 152–153, 702/188–189; 81/52, 53.1, 436, 438–440, 81/467, 474, 478, 480–483; 173/176, 173/180–182; 73/1.09, 1.12, 862.08, 73/862.23, 862.334–862.335

See application file for complete search history.

(56) References Cited

U.S. PATENT DOCUMENTS

| | | | |
|---|---|---|---|
| 2,889,729 | A | 6/1959 | Orner |
| 4,091,664 | A | 5/1978 | Zerver |
| 4,265,109 | A | 5/1981 | Hallbauer et al. |
| 4,314,490 | A | 2/1982 | Stone |
| 4,664,001 | A | 5/1987 | Denman |
| 4,760,746 | A | 8/1988 | Kruse et al. |
| 4,958,541 | A | 9/1990 | Annis et al. |
| 5,172,616 | A | 12/1992 | Negishi |
| 5,476,014 | A | 12/1995 | Lampe et al. |
| 5,533,409 | A | 7/1996 | Crane et al. |
| 5,589,644 | A | 12/1996 | Becker et al. |
| 6,070,506 | A | 6/2000 | Becker |
| 6,276,243 | B1 | 8/2001 | Jenkins |
| 6,345,436 | B1 | 2/2002 | Codrington |
| 6,571,646 | B1 | 6/2003 | Truesdell |
| 6,629,055 | B2 | 9/2003 | McGee et al. |
| 6,965,835 | B2 | 11/2005 | McGee et al. |

(Continued)

FOREIGN PATENT DOCUMENTS

| | | | |
|---|---|---|---|
| DE | 29622317 | U1 | 11/1997 |
| DE | 10219568 | A1 | 3/2003 |

(Continued)

OTHER PUBLICATIONS

DE 102007055028A1, May 20, 2009, 11 pp.*

(Continued)

*Primary Examiner* — Toan Le

(74) *Attorney, Agent, or Firm* — Marshall, Gerstein & Borun LLP

(57) ABSTRACT

An angle measuring device or system can include a wrench or a bracket, for example, and a digital angle meter. The a wrench or bracket can include a head or head plate portion for engaging a nut, a bolt, or crankshaft, a central axis about which the wrench or bracket rotates during use, and a longitudinal axis perpendicular to the central axis. The digital angle meter can be attached to the wrench or bracket and include a housing, a processor, and at least one gyrometer. The at least one gyrometer including a first axis extending parallel to the longitudinal axis for determining the rotational orientation of the wrench or bracket relative to a reference position.

38 Claims, 8 Drawing Sheets

(56) References Cited

U.S. PATENT DOCUMENTS

| | | | | |
|---|---|---|---|---|
| 6,968,759 | B2 | 11/2005 | Becker et al. | |
| 7,082,866 | B2 * | 8/2006 | Becker | 81/479 |
| 7,089,834 | B2 | 8/2006 | Reynertson et al. | |
| 7,234,378 | B2 | 6/2007 | Reynertson, Jr. | |
| 7,313,990 | B1 | 1/2008 | Shiao | |
| 7,415,897 | B2 | 8/2008 | Shiao | |
| 7,448,284 | B2 | 11/2008 | Hsieh | |
| 7,458,297 | B1 | 12/2008 | Shiao | |
| 7,562,589 | B2 | 7/2009 | Anjanappa et al. | |
| 7,565,844 | B2 * | 7/2009 | Crass et al. | 73/862.21 |
| 7,823,465 | B2 | 11/2010 | Makimae et al. | |
| 7,841,100 | B2 * | 11/2010 | Lucke | 33/534 |
| 2003/0065474 | A1 | 4/2003 | McGee et al. | |
| 2005/0223856 | A1 | 10/2005 | Reynertson et al. | |
| 2009/0078057 | A1 | 3/2009 | Schultz et al. | |
| 2009/0084232 | A1 | 4/2009 | Makimae et al. | |
| 2009/0249924 | A1 | 10/2009 | Lin | |
| 2010/0199782 | A1 | 8/2010 | Hsieh | |
| 2011/0291647 | A1 | 12/2011 | Lee et al. | |
| 2012/0132043 | A1 * | 5/2012 | Chen et al. | 81/479 |

FOREIGN PATENT DOCUMENTS

| | | | | |
|---|---|---|---|---|
| DE | 202004017472 | U1 | | 1/2005 |
| DE | 202007002793 | U1 | | 5/2007 |
| DE | 102007055028 | | * | 5/2009 |
| DE | 102007055028 | A1 | | 5/2009 |
| EP | 1022097 | A2 | | 7/2000 |
| EP | 2147751 | A1 | | 1/2010 |
| EP | 2394792 | A1 | | 12/2011 |
| GB | 2273574 | A | | 6/1994 |
| TW | 201003765 | A | | 10/2010 |
| WO | WO-96/16761 | A1 | | 6/1996 |

OTHER PUBLICATIONS

English Version of DE 102007055028A1, May 20, 2009, 11 pp.*

Partial International Search Report for Application No. PCT/US2012/056510 issued Dec. 21, 2012.

International Search Report for Application No. PCT/US12/056510 dated Feb. 27, 2013.

Written Opinion for Application No. PCT/US12/056510 dated Feb. 27, 2013.

International Preliminary Report on Patentability for Application No. PCT/US2012/056510 dated Mar. 25, 2014.

* cited by examiner

DIGITAL ANGLE METER

FIELD OF THE DISCLOSURE

The present disclosure is directed to an angle meter and, more particularly, to a digital angle meter.

BACKGROUND

Conventionally, when determining top dead center, cam centerline, or cam duration, for example, of an internal combustion engine, technicians use degree wheels. Degree wheels are large preprinted discs with graduated markings showing degrees of rotation. These wheels are fixed to the engine block and the technician can then rotate the crankshaft with a tool to record the necessary measurements. Similarly, when using a torque wrench, technicians are often required to measure the degree of rotation of a nut or bolt, for example, after applying some known quantity of torque. These measurements can be taken through the use of a mechanical angle gauge/dial. Using a degree wheel for measuring crankshaft position and a mechanical angle gauge/dial for measuring degree of rotation of a torque wrench is time consuming and tedious.

SUMMARY

One aspect of the present disclosure provides for a wrenching device including a wrench and a digital angle meter removably attached to the wrench. The wrench includes a head for engaging a nut or a bolt, a handle, and a stem extending between the head and the handle. The head further includes a central axis about which the wrench rotates during use. The handle is for being grasped by a user. The stem and the handle extend along a common longitudinal axis of the wrench. The digital angle meter is removably attached to the wench and includes a housing, a processor, and at least one gyrometer electrically coupled to the processor. The at least one gyrometer includes a first axis extending parallel to the longitudinal axis of the wrench and a second axis extending perpendicular to the longitudinal axis of the wrench.

Another aspect of the present disclosure provides for a wrenching device including a wrench and a digital angle meter fixedly attached to the wrench. The wrench includes a head for engaging a nut or a bolt, a handle, and a stem extending between the head and the handle. The head further includes a central axis about which the wrench rotates during use. The handle is for being grasped by a user. The stem and the handle extend along a common longitudinal axis of the wrench. The digital angle meter is fixedly attached to the stem of the wrench between the handle and the head, and includes a housing, a processor, and at least one gyrometer electrically coupled to the processor. The at least one gyrometer includes a first gyrometer axis extending parallel to the longitudinal axis of the wrench.

Another aspect of the present disclosure includes an angle measuring device including a housing, a cavity, a processor, an elongated groove and an attachment mechanism. The housing has opposing first and second face portions and a perimeter portion extending between the first and second face portions. The cavity is defined within the housing. The processor and at least one gyrometer are disposed within the cavity. The at least one gyrometer is electrically coupled to the processor and includes a first gyrometer axis for measuring an angle of the device relative to a reference position. The elongated groove is formed in and extends across the second face of the housing. The attachment mechanism is disposed adjacent to the elongated groove for removably attaching the device to an elongated support member.

Yet another aspect of the present disclosure includes an angle measuring system including a sensor housing, a sensor processor and at least one gyrometer, a first wireless interface, a display housing, a display processor, and a second wireless interface. The sensor housing has opposing first and second face portions and a perimeter portion extending between the first and second face portions. The sensor processor and the at least one gyrometer are disposed within the sensor housing and the at least one gyrometer electrically is coupled to the sensor processor. The at least one gyrometer includes a first gyrometer axis for determining a measured angle of the device relative to a reference position. The first wireless interface is carried by the sensor housing and is electrically connected to the sensor processor for transmitting a signal indicative of the measured angle. The display housing is disposed separate from and movable relative to the sensor housing. The display processor is disposed in the display housing. The display device is carried by the display housing and is electrically connected to the display processor. The second wireless interface is carried by the display housing and electrically connected to the display processor. The second wireless interface is for receiving the signal from the first wireless transmitter such that the display processor receives the signal and instructs the display device to display the measured angle.

Still another aspect of the present disclosure includes a crankshaft degree tooling system for determining at least one of top piston top dead center, cam centerline, or cam duration. The system includes a crankshaft bracket and a digital angle meter. The crankshaft bracket includes a head plate portion and a stem plate portion. The head plate portion is for engaging a crankshaft of an internal combustion engine and has a central axis around which the crankshaft bracket rotates during use. The stem plate portion extends radially outward from a perimeter of the head plate portion along a longitudinal axis that is perpendicular to the central axis. The digital angle meter is removably attached to the stem plate portion and includes a housing, a processor, and at least one gyrometer electrically coupled to the processor. The at least one gyrometer includes at least a first axis extending parallel to the longitudinal axis.

DETAILED DESCRIPTION

The present disclosure is directed to new and improved devices, systems, and methods for measuring angles of rotation, for example, of torque wrenches, crankshafts, and other rotatable components, and for performing algorithms for the automatic determination of various calculations and measurements. This is achieved through novel configurations of electronics and/or structural components including, for example, one or more gyrometers and processors carried within a uniquely designed housing that promotes adaptability, flexibility, usability, compactness, and accuracy.

Figure 1:
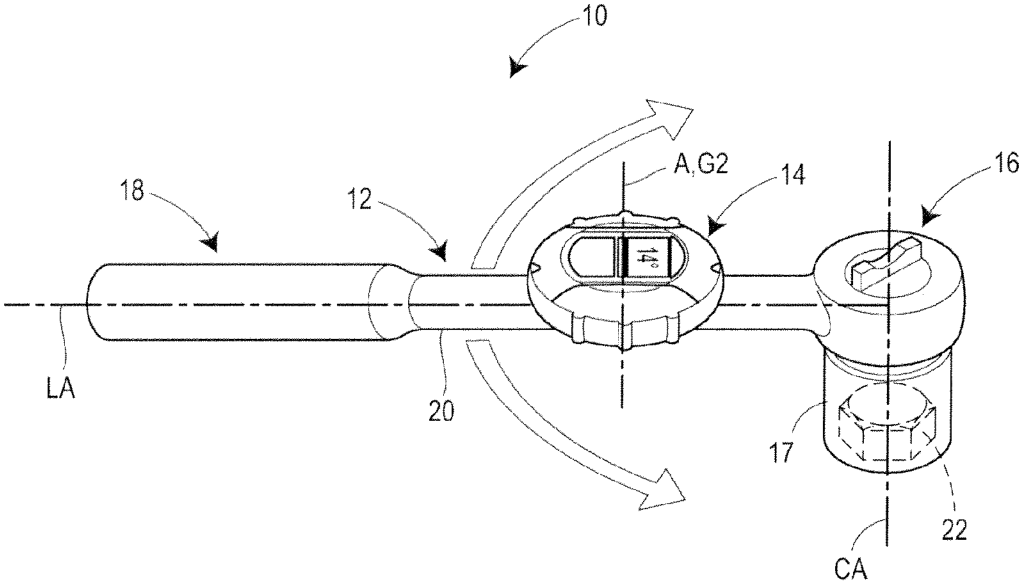
FIG. 1 is a perspective view of a wrenching device constructed in accordance with the principles of the present disclosure.

Referring now to FIG. 1, one version of a wrenching device 10 constructed in accordance with the teachings of the present disclosure is illustrated. The wrenching device 10 of the version depicted in FIG. 1 includes a wrench 12 and a digital angle meter 14 removably connected to the wrench 12. The wrench 12 includes ahead 16, a handle 18, and a stem 20. The head 16 includes a socket 17 defining a recess 22 for engaging a nut, a bolt, or a crankshaft, for example, and can include a conventional ratchet mechanism or a breaker bar, for example, for facilitating manipulation of the nut, bolt, or crankshaft. As such, the recess 22 can have a hexagonal cross-section, for example, or any cross-section required to engage a crankshaft or other nut or bolt shape. The stem 20 includes an elongated member extending between the head 16 and the handle 18. The stem 20 can include a cylindrical cross-section. The handle 18 also includes an elongated member and is adapted to be grasped by a user during use. Accordingly, the handle 18 can include a knurled surface or some other surface treatment to minimize slippage. In one version, the head 16, handle 18, and stem 20 are constructed from a metallic material such as steel, for example, similar to conventional wrenches, ratchets, torque wrenches, etc.

As shown in FIG. 1, the head 16 of the wrench 12 has a central axis CA about which the wrench 12 rotates during use. Additionally, the stem 20 and the handle 18 extend along a common longitudinal axis LA of the wrench 12. The longitudinal axis LA of the wrench 12 depicted in FIG. 1 is perpendicular to the central axis CA of the head 16. However, the wrench 12 may be configured such that the longitudinal axis LA is disposed at any angle transverse to the central axis CA. In some versions, the head 16 may swivel, rotate, or otherwise pivot relative to the stem 20 and handle 18 such that the angular relationship between the longitudinal axis LA and the central axis CA can vary and does not necessarily have to be perpendicular.

Still referring to FIG. 1, the digital angle meter 14 is removably attached to the stem 20 of the wrench 12 between the head 16 and the handle 18. Said another way, the digital angle meter 14 is removably attached to the wrench 12 at a location that is offset from and spaced from the central axis CA of the head 16. This placement of the digital angle meter 14 does not interfere with the dimensions of the head 16 such that the head 16 can operate within tight spaces in an engine compartment, or other tightly constrained working environment, for example.

Figure 2:
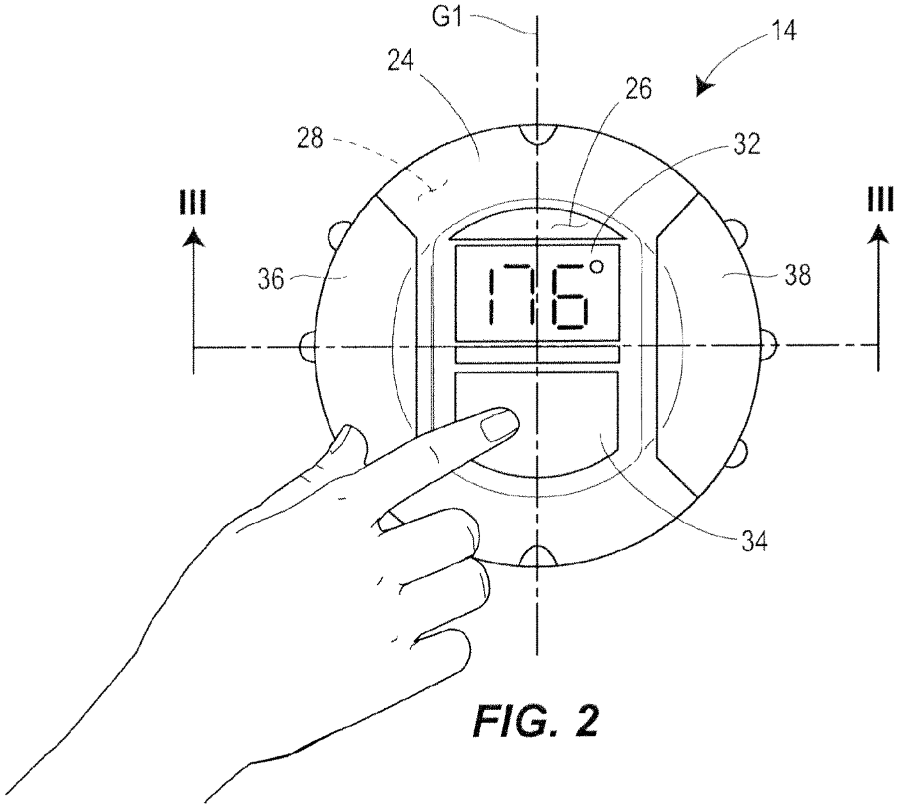
FIG. 2 is a top view of a digital angle meter constructed in accordance with the present disclosure.
Figure 3:
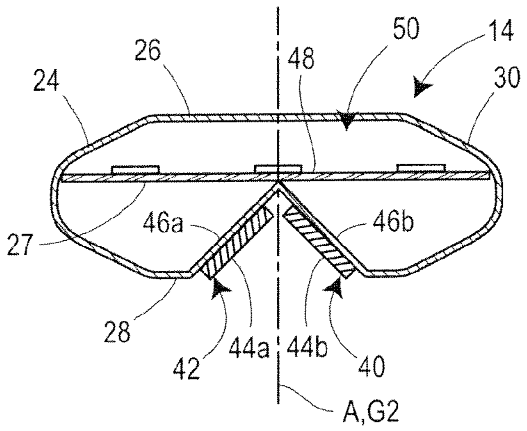
FIG. 3 is a cross-sectional view of the digital angle meter of FIG. 2.
Figure 4:
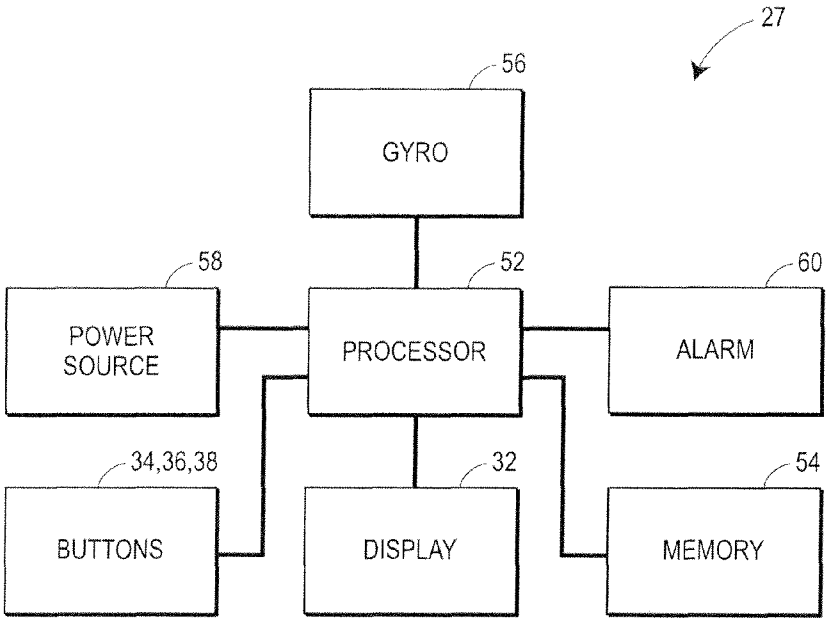
FIG. 4 is a block diagram of an electrical circuit of the digital angle meter of FIG. 2.

Referring now to FIGS. 2-4, the digital angle meter 14 is maintained within a housing 24 and includes an electrical circuit 27 (shown in FIG. 4) for performing various tasks, as will be described herein. The housing 24 can be constructed of plastic or some other impact resistant type material and, as depicted in FIGS. 2 and 3, is a disc-shaped structure including opposing first and second faces 26, 28 and a perimeter 30 connecting the first and second faces 26, 28. The first face 26 carries a digital display 32 and a "Selector" button 34. The perimeter 30 carries an "Up" button 36 and a "Down" button 38 at locations adjacent to the first face 26. These buttons 34, 36, 38 are operable in conjunction with the electrical circuit 27 to instruct operation of the digital angle meter 14. Other configurations of the buttons 34, 36, 38 and display 32 of course can also be included within the scope of the present disclosure.

As shown in the cross-sectional representation illustrated in FIG. 3, the digital angle meter 14 includes an elongated groove 40 in the second face 28 of the housing 24. The elongated groove 40 is shaped and configured to receive the stem 20 of the wrench in FIG. 1, for example. In this version, the elongated groove 40 extends continuously and entirely through a center of the second face 28 of the housing 24 so as to avoid any interference when receiving the stem 20 of the wrench 12 or other such support member, for example. When the stem 20 is disposed within the elongated groove 40, the digital angle meter 14 is restricted from rotating about an axis A that extends through the housing 24, as shown in FIG. 3, and perpendicular to the groove 40.

To further facilitate the attachment of the digital angle meter 14 to the wrench 12 of FIG. 1, for example, the digital angle meter 14 includes an attachment mechanism 42 adjacent to the elongated groove 40. The attachment mechanism 42 can include at least one magnet, a piece of adhesive material, or other means for maintaining the proximity of the digital angle meter 14 relative to the wrench 12. In FIG. 3, the elongated groove 40 includes a V-shaped cross-section and the attachment mechanism 42 includes first and second elongated magnets **44*a*, 44*b* attached to opposing first and second sidewalls 46*a*, 46*b*, respectively, of the v-shaped groove 40. The magnets 44*a*, 44*b* can be constructed of any conventional magnetic material including, for example, Neodymium 35. While the housing 24 of the presently disclosed angle meter 14 includes the elongated groove 40, the angle meter 40 can be manufactured without the groove 40, if desired. Moreover, while the groove 40 has been described as having a cross-section that is V-shaped in FIG. 3, it could also be U-shaped, square, or have generally any other shape capable of serving the intended purpose of receiving a support member such as the stem 20 of the wrench 12 of FIG. 1**.

Referring now to FIGS. 3 and 4, the electrical circuit 27 of the digital angle meter 14 includes a circuit board 48 and a plurality of electrical components 50 mounted to the circuit board 48. The plurality of components 50 include a processor 52, a memory 54 electrically connected to the processor 52, and at least one gyrometer 56 electrically connected to the processor 52. The processor 52 is also electrically connected to the buttons 34, 36, 38 and the display 32 discussed above in reference to FIG. 2. Additionally, as shown in FIG. 4, the processor 52 is electrically connected to a power source 58 and an alarm 60. In the disclosed version of the digital angle meter 14, the at least one gyrometer 56 includes at least a first gyrometer axis G1, as shown in FIG. 3. The first gyrometer axis G1 extends through the digital angle meter 14 and parallel to the longitudinal axis LA of the wrench 12 during use. As such, the at least one gyrometer 56 can determine an angle of the wrench 12 relative to a reference position, during use, based on the first gyrometer axis G1.

The digital angle meter 14 can also optionally include a second gyrometer axis G2 that is perpendicular to the first gyrometer axis G1 for determining a position of the digital angle meter 14 relative to the stem 20 of the wrench 12. That is, during use of the device of FIG. 1, for example, the second gyrometer axis G2 should be parallel to the central axis CA of the head 16 of the wrench 12. However, due to the construct of the elongated grove 40, it is possible for the digital angle meter 14 to roll or pitch relative to the stem 20. As such, the at least one gyrometer 56 utilizes the second gyrometer axis G2 to determine to what extent the digital angle meter 14 has rolled or pitched relative to the stem 20. This determination can assist with the accuracy of the determination of the angle of the wrench 12 about the central axis CA of the head 16. However, the second gyrometer axis G2 is not necessary in all applications. The at least one gyrometer 56 can include more than two axes and can include any form of electronic gyroscope, for example, including but not limited to a MEMS gyroscope. Examples of suitable gyrometers include a CMR3000 series gyroscope available from VTI Technologies and INVENSENSE MPU3050 3-Axis MEMS Gyroscope, each of which includes a commercially available three-axis gyroscope. While these gyroscopes include three axes, based on the foregoing description, not necessarily all three would be used.

As mentioned above, the digital angle meter 14 further includes the memory 54 electrically connected to the processor 52. The memory stores logic executable by the processor 54 for performing a number of calculations based on information received from the at least one gyrometer 56 such as the angle of the wrench 12 relative to a reference position. The digital display 3 can then display that angle and/or the result of a related calculation. Finally, as mentioned, the digital angle meter 14 of the present disclosure includes the alarm 60, which is controlled by the processor to emit an alarm signal upon the occurrence of a predetermined condition such as when the wrench 12 of FIG. 1, for example, occupies a predetermined angle. The alarm 60 may include an audible alarm, a visual alarm, or a combination of both. That is, the alarm 60 can include beeps, flashing lights, or any other type of alarm including a vibratory mechanism or other tactile alarm.

Figure 5:
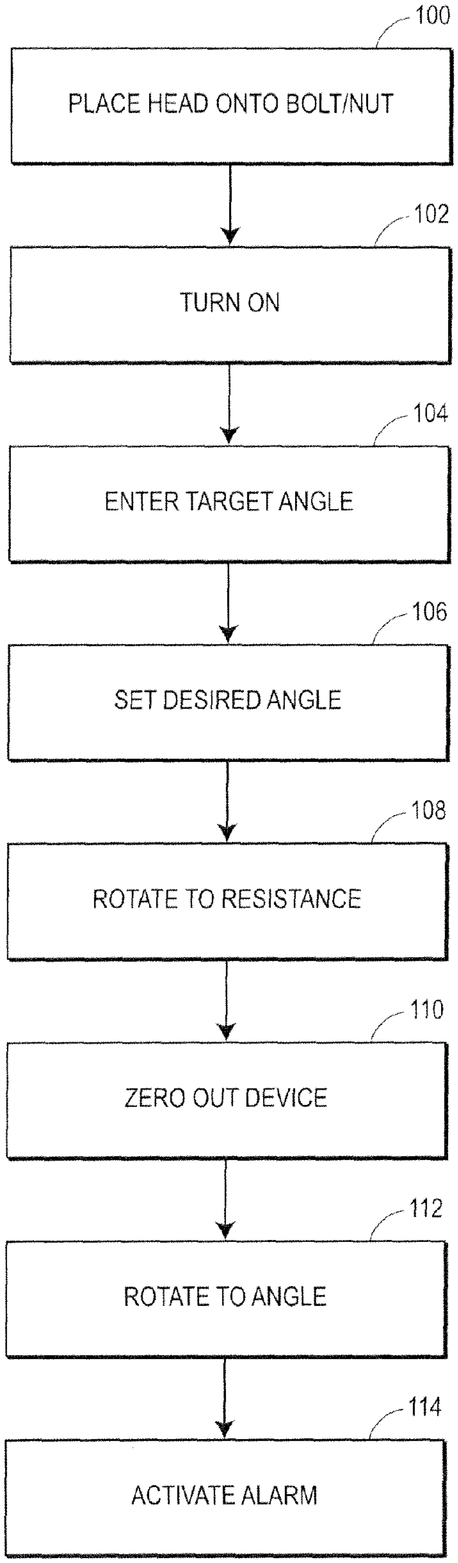
FIG. 5 is a flowchart representative of a method of using the wrenching device in FIG. 1 as a torque wrench.

As mentioned, the device 12 of FIG. 1 can be used as a conventional wrench. To do so, a user first places the head 16 of the wrench 12 onto a nut or bolt to be tightened, as indicated by block 100 in FIG. 5. The, at block 102, the user can depress and hold the "Selector" button 34 for a number of seconds until the display 32 illuminates to indicate that the digital angle meter 14 is powered on. Using the "Up" and "Down" buttons, the user can then enter a desired angle for the nut or bolt to be turned passed resistance, as shown at block 104. While the user manipulates the "Up" and "Down" buttons, the digital display 32 reads out the angle number. When the desired angle is displayed on the digital display 32, the user can depress the "Selector" button 34 to set the displayed angle, as shown at block 106. Then, as indicated by block 108 in FIG. 5, the user begins to rotate the wrench 12 around the central axis CA of the head 16, until the user senses resistance. Upon reaching a point where resistance is sensed, the user then again depresses the "Selector" button 34 to zero out the digital display 32 on the angle meter 14, as shown at block 110. Then, as indicated by block 112, the user further rotates the wrench 12 around the central axis CA and tightens the nut or bolt until the digital display 32 displays the desired angle, which was pre-set at block 106.

As the user rotates the wrench 12, the electrical circuit 27 continuously measures the angle of rotation of the wrench 12, relative to the zeroed out position, and displays the angle on the digital display 32. The digital display 32 can be configured to only display the angle of rotation in the positive direction away from the zeroed out position. That is, if the wrench 12 includes a ratcheting functioning, negative rotation back toward the zeroed out position of the wrench 12 should not be indicated on the display 32. The electrical circuit 27 can be programmed to automatically detect and ignore negative rotation sensed by the gyrometer 56, or this function can be manually operated. For example, during a manual operation, prior to initiating negative rotation, the user can depress the "Selector" button 34, or another button, to freeze the display and instruct the electrical circuit 27 to ignore the forthcoming negative rotation. Upon the wrench 12 being ratcheted back in the negative direction and into its desired position, the user can then again move the ratchet in the positive direction until resistance is reached. Upon reaching resistance, the user can again depress the "Selector" button 34 to instruct the electrical circuit 27 to continue monitoring and displaying the change in positive angular rotation away from the zeroed out position toward the desired angle.

Upon reaching the desired angle, the alarm 60 on the angle meter 14 can emit an alarm signal in the form of a beep, a buzz, a light, a vibration, etc., as indicated by block 114. In one form, the angle meter 14 can have, for example, three LED lights as a part of the alarm 60. For example, when the digital display 32 reads 90% of the target angle, a yellow LED light can be illuminated; when the digital display 32 reads 100% of the target angle, a green LED light can be illuminated; and, when the digital display reads 110% of the target angle, a red LED light can be illuminated. Alternatively, or additionally, the alarm, 60 could include an audible alarm that, for example, begins beeping when the digital display reaches 90% and steadily increases in frequency until the digital display reads 100%, at which point, the angle meter 14 emits a constant beep. The foregoing alarm scenarios are mere examples and other alarm sequences are intended to be included within the scope of the present disclosure. Once the target angle is reached, the torque wrench application of the device 12 depicted in FIG. 1 is complete.

As mentioned, the digital angle meter 14 measures and displays the angle of the wrench 12 as it rotates around the central axis CA of the head 16. This measurement is obtained through the use of the at least one gyrometer 56, in a known manner, in combination with the logic stored on the memory 54 and executed by the processor 52.

Figure 6:
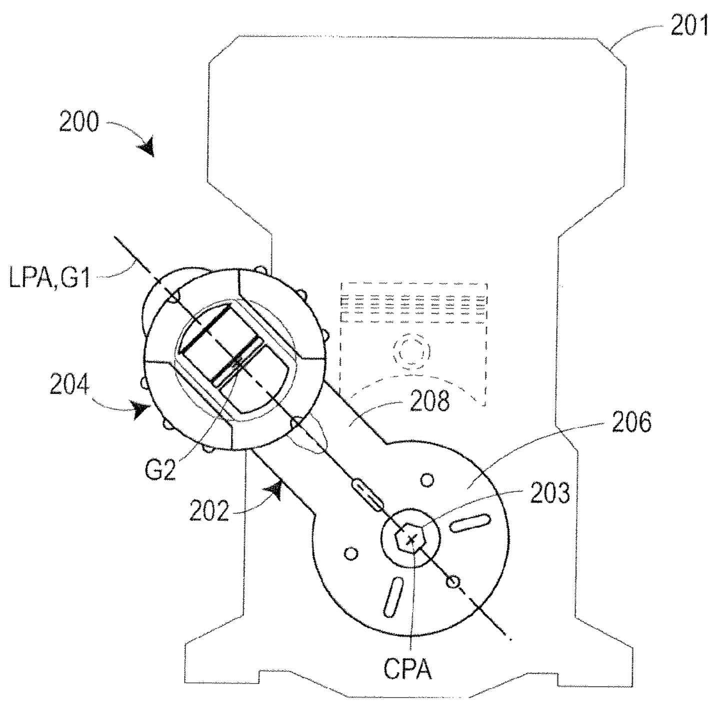
FIG. 6 is a plan view of a crankshaft degree tooling system constructed in accordance with the present disclosure.
Figure 7:
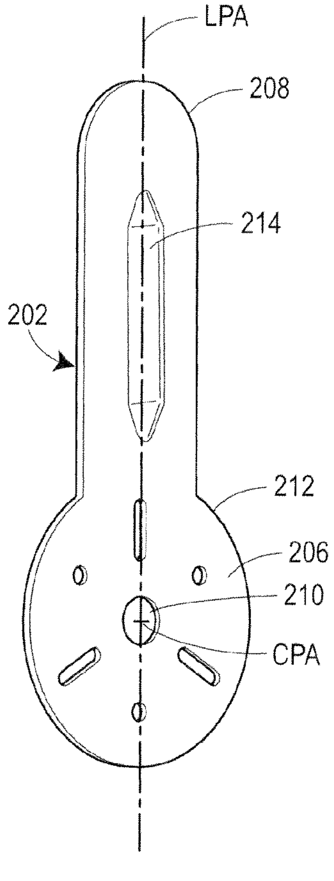
FIG. 7 is a plan view of a crankshaft bracket of the system of FIG. 6.

While the digital angle meter 14 has thus far been described as being used with the wrench 12 disclosed in reference to FIG. 1, other applications and uses are intended to included within the present disclosure. For example, FIG. 6 depicts a crankshaft degree tooling system 200 constructed in accordance with the present disclosure for determining, for example, piston top dead center, cam centerline, and/or cam duration of an internal combustion engine 201. The system 200 of FIG. 6 includes a crankshaft bracket 202 and a digital angle meter 204. The digital angle meter 204 can be identical to the digital angle meter 14 disclosed above with reference to FIGS. 1-5. The crankshaft bracket 202 includes a single piece of metallic material stamped or otherwise formed into the configuration illustrated in FIGS. 6 and 7. That is, the crankshaft bracket 202 includes a head plate portion 206 and a stem plate portion 208. The head plate portion 206 is circular and defines an aperture 210 in the center thereof for engaging a crankshaft 203 of the internal combustion engine 201, as illustrated in FIG. 6, for example. So configured, the head plate portion 206 includes a central plate axis CPA around which the crankshaft bracket 202 rotates during use. The central plate axis CPA corresponds directly to a central axis of the crankshaft of the engine itself. The stem plate portion 208 extends radially outward from a perimeter 212 of the head plate portion 206 and along a longitudinal plate axis LPA that is transverse and, more particularly, perpendicular to the central plate axis CPA. As illustrated in FIG. 7, the crankshaft bracket 202 also includes an elongated protrusion 214 extending outward away from a face 216 of the stem plate portion 208. The elongated protrusion 214 is adapted to be removably received in the elongated groove 40 of the digital angle meter 204 to restrict rotation of the digital angle meter 204 relative to the crankshaft bracket 202 when removably attached thereto by the attachment mechanism 42 (e.g., the magnets 44*a*, 44*b*). That is, the magnets 44*a*, 44*b* depicted in FIG. 3 are sufficiently strong to attract to the elongated protrusion 214 on the stem plate portion 208 of the crankshaft bracket 202 and hold the digital angle meter 204 in position. So attached, the first gyrometer axis G1 shown in FIGS. 2 and 6 of the digital angle meter 204 extends parallel to the longitudinal plate axis LPA of the crankshaft bracket 202. Additionally, in versions where the at least one gyrometer 56 includes a second gyrometer axis G2, the second gyrometer axis G2 extends perpendicular to the first gyrometer axis G1. However, because the stem plate portion 208 of the crankshaft bracket 202 is flat, there is no tendency for the digital angle meter 204 to roll or pitch about the longitudinal plate axis LPA and, as such, the second gyrometer axis G2 is likely to remain parallel with the central plate axis CPA at all times.

With the system 200 arranged and configured as described with reference to FIGS. 6 and 7, the digital angle meter 204 can be utilized to determine piston top dead center, cam centerline, and/or cam duration. For example, with reference to the flowchart depicted in FIG. 8, a user can first depress the "Selector" button 34 of the digital angle meter 204 for a few seconds to turn on the device, as indicated at block 300. If the display 32 reads "TDC," the user again depresses the "Selector" button 34 to start the top dead center measurement process, as indicated at block 302. As indicated at block 304, the user, using a conventional wrench, rotates the engine clockwise until the piston contacts a stop mechanism previously installed onto the engine in a known manner, and depresses the "Selector" button 34, as indicated at block 304. The digital angle meter 204 stores a first angle $\alpha 1$ in the memory 54, which is representative of the position of the crankshaft bracket 202 in this first stop position. Throughout the rotation of the engine in the clockwise direction, the digital angle meter 204 continuously displays the rotational angle of the crankshaft bracket 202 relative to the starting position of the crankshaft bracket 202. Then, as indicated at block 306, the user rotates the engine in the counterclockwise direction until the piston again contacts the stop mechanism, and presses the "Selector" button 34. The digital angle meter 204 stores a second angle $\alpha 2$ in the memory 54, which is representative of the position of the crankshaft bracket 202 in this second stop position. Instead of pressing the "Selector" button 34 to initiate the storage of the first and second angles $\alpha 1$, $\alpha 2$ at blocks 304 and 206, respectively, the digital angle meter 204 itself could be configured such that when the at least one gyrometer 56 detects that the crankshaft bracket 202 has stopped moving for a predetermined period of time, for example 2 seconds, the digital angle meter 204 automatically stores the first and second angles $\alpha 1$, $\alpha 2$.

The processor 52 of the digital angle meter 204 then automatically calculates and displays the top dead center based on the first and second stored angles $\alpha 1$, $\alpha 2$, as indicated at block 308. The top dead center (TDC) is calculated by summing the first and second angles $\alpha 1$, $\alpha 2$, subtracting that sum from 360 degrees, and dividing the difference by two. The equation is as follows: $TDC=[360-(\alpha 1+\alpha 2)]/2$.

Figure 8:
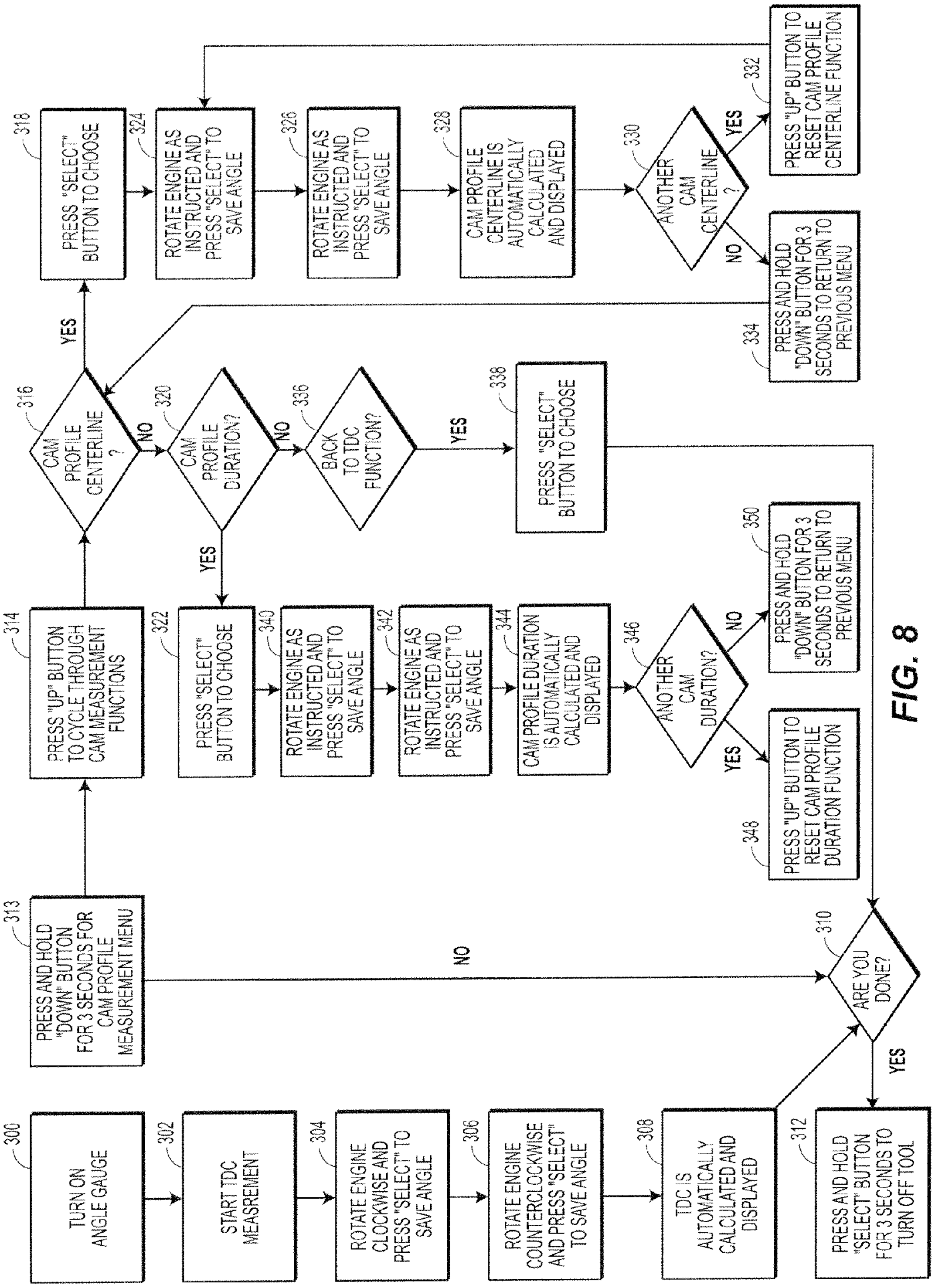
FIG. 8 is a flowchart representative of a method of using the crankshaft degree tooling system of FIG. 6.

At this point, if the user is done, the user may depress the "Selector" button 34 for a few seconds to turn off the digital angle meter 204, as indicated by blocks 310, 312 in FIG. 8. If, however, the user would like to continue on and measure the cam centerline and/or the cam duration of the engine, the user can depress the "Down" button 36, for example, for a few seconds until the display 32 displays a cam measurement menu, as indicated at block 313. The user can then depress the "Up" button 38 to cycle through the cam measurement options, i.e., cam profile centerline (CPC) and cam profile duration (CPD), as indicated at block 314. If the user want to measure the cam profile centerline, the user depresses the "Selector" button 34 when the display 32 reads "CPC," as indicated by blocks 316 and 318. If, however, the user instead wants to measure the cam duration, the user depresses the "Selector" button 34 when the display reads "CPD," as indicated at blocks 320 and 322.

When the CPC measurement is selected, the user rotates the engine until a dial caliper fixed to the engine in a known manner reads 0.050" and depresses the "Selector" button 34 to save a first angle $\beta 1$ associated with the first 0.050" caliper position, as indicated at block 324 of FIG. 8. Then, the user then continues to rotates the engine until the dial caliper peaks and then drops back to 0.050" and depresses the "Selector" button 34 to save a second angle $\beta 2$ associated with the second 0.050" caliper position, as indicated at block 326. Similar to that mentioned above with respect to calculating TDC, instead of pressing the "Selector" button 34 to initiate the storage of the first and second angles $\beta 1$, $\beta 2$ at blocks 324 and 326, respectively, the digital angle meter 204 itself could be configured such that when the at least one gyrometer 56 detects that the crankshaft bracket 202 has stopped moving for a predetermined period of time, for example 2 seconds, the digital angle meter 204 automatically stores the first and second angles $\beta 1$, $\beta 2$. The processor 52 of the digital angle meter 204 then automatically calculates and displays the cam profile centerline (CPC) based on the first and second angles $\beta 1$, $\beta 2$, as indicated at block 328. The cam centerline is calculated by adding the first and second angles $\beta 1$, $\beta 2$ together and dividing the sum by two. That is, the equation is as follows: $CPC=[\beta 1+\beta 2]/2$.

If the user is interested in performing another CPC measurement, the user can depress the "Up" button 38 on the digital angle meter 204 to return to block 324 of FIG. 8, as indicated by blocks 330 and 332. Otherwise, the user can depress the "Down" button 36 for a few seconds to return to block 316, as indicated at block 334. At block 316, the user has another option to pursue another cam centerline measurement, or a cam profile duration measurement.

For the sake of description, if the user wishes to quit, the digital angle meter 204 scrolls back through the options, as indicated by blocks 320, 336, and 338. Thus, the user has the option to pursue another TDC measurement if desired, as indicated at block 336, for example.

If the user wishes to pursue a cam profile duration (CPD) measurement, the user presses the "Selector" button 34, as indicated at blocks 320, 322. Then, as indicated at block 340, the user rotates the crankshaft of the engine until a dial caliper fixed to the engine in a known manner gives some reading and depresses the "Selector" button 34 to store a first angle $\gamma 1$ associated with this first position. Identifying the first position may require the user to move the crankshaft back and forth in small increments to identify the precise location of the first reading taken by the dial caliper. Then, as indicated by block 342, the user continues to rotate the crankshaft of the engine until the dial caliper peaks and drops back down to a reading of zero lift and depresses the "Selector" button 34 to store a second angle $\gamma 2$ associated with this second position. Again, identifying this second position may require the user to move the crankshaft back and forth to precisely identify when the dial caliper returns to zero. Similar to that mentioned above with respect to calculating TDC and CPC, instead of pressing the "Selector" button 34 to initiate the storage of the first and second angles γ1, γ2 at blocks 340 and 342, respectively, the digital angle meter 204 itself could be configured such that when the at least one gyrometer 56 detects that the crankshaft bracket 202 has stopped moving for a predetermined period of time, for example 2 seconds, the digital angle meter 204 automatically stores the first and second angles γ1, γ2.

With the first and second angles γ1, γ2 determined and stored in the memory 54, the processor 52 of the angle meter 204 automatically calculates and displays the cam profile duration (CPD), as indicated at block 344. The cam profile duration (CPD) is calculated by subtracting the first angle γ1 from the second angle γ2. That is, the equation is as follows: CPD=γ2−γ1.

Once the cam profile duration is calculated and displayed, the digital angle meter 204 enables the user to decide to pursue another CPD measurement, as indicated by blocks 346 and 348, or return to previous menus, as indicated at blocks 346 and 350. Pursuing another CPD measurement returns the process to block 340, as illustrated, while returning to previous menus returns the process to block 320. When the user is ultimately done using the system 200, the "Selector" button 34 can be depressed and held for a few seconds to turn the power off. Upon restarting the system 200, the previous measurements will remain stored in the memory until new measurements are taken.

Thus, from the foregoing, it should be appreciated that the devices and systems disclosed herein provide for accurate, repeatable, and predictable measurement techniques for torque wrenches, as well as crankshaft degree measuring tools.

While the system 200 of FIGS. 6 and 7 has been described as utilizing a specific crankshaft bracket 202, it should be appreciated that other items could be used to serve the purpose of the bracket 202. For example, a user could fashion a bracket out of a piece of sheet metal that may or may not include a protrusion similar to the elongated protrusion 214.

Figure 9:
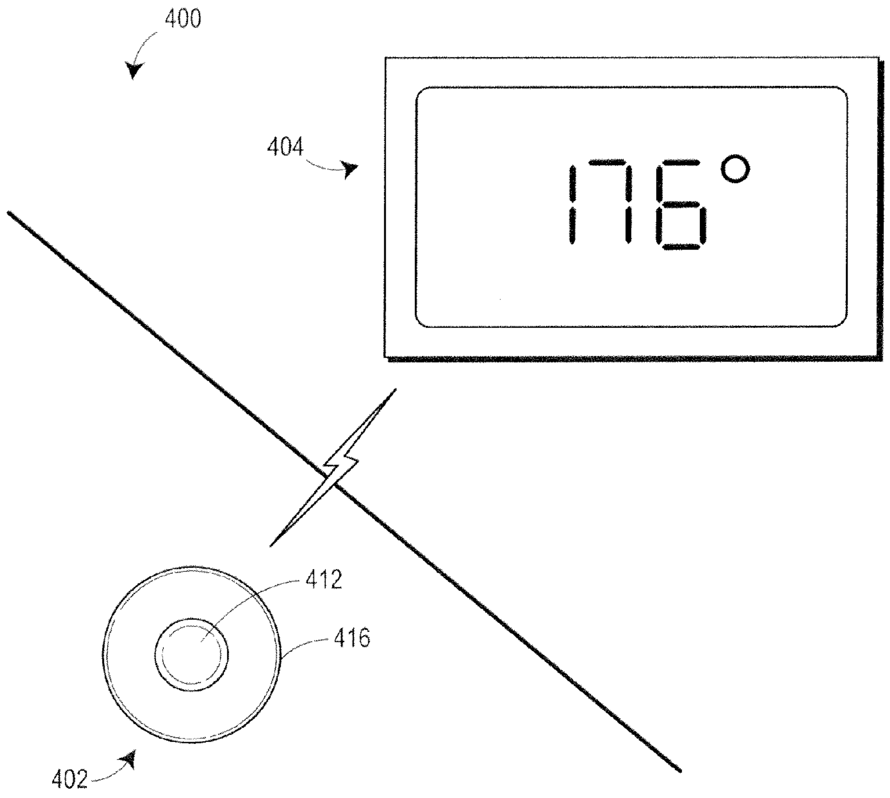
FIG. 9 is a perspective view of a digital angle meter system constructed in accordance with the present disclosure.
Figure 10:
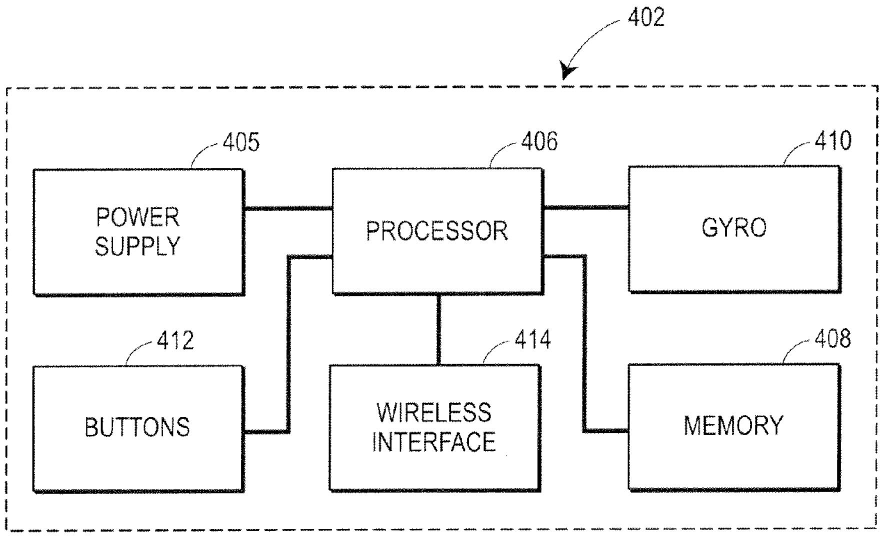
FIG. 10 is a block diagram of an electrical circuit of a sensor component of the digital angle meter of FIG. 9.
Figure 11:
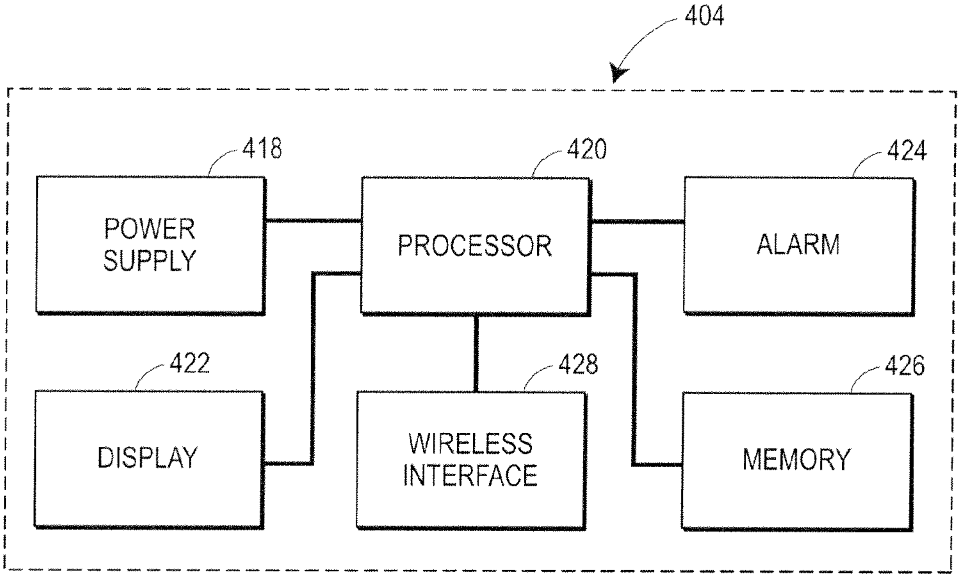
FIG. 11 is a block diagram of an electrical circuit of a display component of the digital angle meter of FIG. 9.

While the various devices and systems described thus far have included digital angle meters 14, 204 equipped with display and alarm components carried on-board the same component that performs the measuring, calculating, etc., in an alternative version, the digital angle meter 14, 204 can be divided up into two components, as depicted in FIGS. 9-11, for example. FIG. 9 depicts a digital angle meter system 400 that includes separate sensor and display components 402, 404 that are in wireless communication with each other. As shown in FIG. 10, the sensor component 402 includes an electrical circuit that includes a power supply 405, a processor 406, a memory 408, at least one gyrometer 410, one or more buttons 412, and a wireless interface 414. Each of these components are carried within a sensor housing 416, which can be designed and constructed similar to the housing 24 of the digital angle meter 12 described with reference to FIGS. 1-8. That is, the sensor housing 416 of the system 400 can include an elongated groove, similar to groove 40 described above, for facilitating attachment and alignment onto a stem of a wrench or a crankshaft bracket, for example. In contrast, however, because the sensor component 402 lacks a display, the external dimensions may be smaller than the external dimensions of the digital angle meters 14, 204 described above. The sensor component 402 works identical to the digital angle meters 14, 204 described above, except that it does not perform any displaying function. Rather, the processor 406 of the sensor component 402 generates a signal indicative of the various measurements and calculations that it performs and sends that signal out via the wireless interface 414.

The display component 404 is therefore equipped to receive signals from the sensor component 402 and display the desired information. Accordingly, the display component 404, as depicted in FIG. 11, includes a power supply 418, a processor 420, a display 422, an alarm 424, a memory 426, and a wireless interface 428. So configured, the wireless interface 428 of the display component 404 is configured to receive signals transmitted from the wireless interface 414 of the sensor component 402. The processor 420 of the display component 404 then processes those signals and instructs the display 422 to display angles and the results of computations in accordance with any of the processes described above with reference to FIGS. 1-8. Additionally, as the display component 404 is also equipped with the alarm 424, the processor 420 communicates with the alarm 420 to activate the same at the appropriate time as discussed above.

While FIG. 9 illustrates the one or more buttons 412 of the sensor device 402 as including a single button, it should be appreciated that the sensor component 402 could be equipped with each of the "Selector," "Up," and "Down" buttons, as described above with reference to the digital angle meters 12, 204 in FIGS. 1-8. Alternatively, the one or more buttons 412 may not be part of the sensor component 402 at all, but rather, part of the display component 404. In other forms, the sensor component 402 and the display component 404 could be equipped with buttons for functioning the system 200, or the system could include a separate remote control including the buttons 34, 36, 38, for example, for controlling the system.

The system 400 disclosed with references 9-11 advantageously enables a user to position the display component 404 at a location remote from the sensor component 402. This could be beneficial in working environments where the user may not be able to gain a direct line of sight to the display 32 on the digital angle meters 12, 204 described above. With the system 400, the user could, for example, mount the display component on a work bench, wall, or other location, where the display 422 could be easily viewed by the user and other workers. Furthermore, my separating the display 422 and alarm 424 from the sensor component 402, the size of the sensor component 402 can be reduced, which may enable the system 400 to be used in situations where the larger angle meters 14, 204 are too large and cumbersome.

In view of the foregoing, it should be appreciated that the present disclosure is not intended to be limited to the specific examples disclosed, but rather, also includes any foreseeable alternative constructs that a person having ordinary skill in the art would understand to be logically included.

What is claimed:

1. A wrenching device, comprising:

a wrench comprising a head for engaging a nut or a bolt, a handle, and a stem extending between the head and the handle, the head having a central axis about which the wrench rotates during use, the handle for being grasped by a user, the stem and the handle extending along a common longitudinal axis of the wrench;

a digital angle meter removably attached to the wrench, the digital angle meter comprising a housing, a processor, and at least one gyrometer electrically coupled to the processor, the at least one gyrometer including a first axis extending parallel to the longitudinal axis of the wrench and a second axis extending perpendicular to the longitudinal axis of the wrench, wherein the housing of the digital angle meter slidingly engages the wrench to allow for rotational displacement of the digital angle meter relative to the wrench about the longitudinal axis of the wrench.

2. The wrenching device of claim 1, wherein the digital angle meter is removably attached to the wrench at a location on the stem between the head and the handle.

3. The wrenching device of claim 1, wherein the digital angle meter is removably attached to the wrench at a location spaced from the central axis of the head.

4. The wrenching device of claim 1, wherein the stem of the wrench is a metallic material and the digital angle meter includes at least one magnet removably attaching the digital angle meter to the stem of the wrench.

5. The wrenching device of claim 4, wherein the housing of the digital angle meter defines an elongated groove, in which the at least one magnet is fixed.

6. The wrenching device of claim 5, wherein the elongated groove includes a v-shaped cross-section defined by first and second opposing sidewalls, and the at least one magnet includes a first magnet attached to the first sidewall and a second magnet attached to the second sidewall.

7. The wrenching device of claim 1, wherein the digital angle meter further includes a memory and logic stored in the memory, the logic executable by the processor for calculating an angle of the wrench relative to a reference position.

8. The wrenching device of claim 7, further comprising a digital display communicatively coupled to the processor, the display for displaying the angle of the wrench relative to the reference position.

9. The wrenching device of claim 8, wherein the digital display is carried by a display device, the display device being separate from and movable relative to the digital angle meter.

10. The wrenching device of claim 8, further comprising an alarm communicatively coupled to the processor for emitting an alarm signal upon the wrench occupying a preset angle relative to the reference position.

11. An angle measuring device, comprising:

a housing having opposing first and second face portions and a perimeter portion extending between the first and second face portions;

a cavity defined within the housing;

a processor and at least one gyrometer disposed within the cavity, the at least one gyrometer electrically coupled to the processor and including a first gyrometer axis for measuring an angle of the device relative to a reference position;

an elongated groove formed in and extending across the second face of the housing; and an attachment mechanism disposed adjacent to the elongated groove for removably attaching the device to an elongated support member, wherein the attachment mechanism includes at least one magnet embedded within the housing adjacent to the elongated groove, and wherein the elongated groove includes a v-shaped cross-section defined by first and second opposing sidewalls, and the at least one magnet includes a first magnet attached to the first sidewall and a second magnet attached to the second sidewall.

12. The angle measuring device of claim 11, wherein the elongated groove extends continuously across the entirety of the second face of the housing.

13. The angle measuring device of claim 11, wherein the at least one gyrometer includes a second gyrometer axis extending perpendicular to the first gyrometer axis.

14. The angle measuring device of claim 11, further comprising a memory and logic stored in the memory, the logic executable by the processor for calculating an angle of the device relative to a reference position.

15. The angle measuring device of claim 14, further comprising a digital display communicatively coupled to the processor, the display for displaying the angle of the device relative to the reference position.

16. The angle measuring device of claim 15, wherein the digital display is carried by a display device, the display device being separate from and movable relative to the digital angle meter.

17. The angle measuring device of claim 15, further comprising an alarm communicatively coupled to the processor for emitting an alarm signal upon the device occupying a preset angle relative to the reference position.

18. An angle measuring system, comprising:

a sensor housing having opposing first and second face portions and a perimeter portion extending between the first and second face portions;

a sensor processor and at least one gyrometer disposed within the sensor housing, the at least one gyrometer electrically coupled to the sensor processor and including a first gyrometer axis for determining a measured angle of the device relative to a reference position;

a first wireless interface carried by the sensor housing and being electrically connected to the sensor processor for transmitting a signal indicative of the measured angle;

a display housing disposed separate from and movable relative to the sensor housing;

a display processor disposed in the display housing;

a display device carried by the display housing and being electrically connected to the display processor; and a second wireless interface carried by the display housing and electrically connected to the display processor, the second wireless interface for receiving the signal from the first wireless transmitter such that the display processor receives the signal and instructs the display device to display the measured angle, wherein the sensor housing defines an elongated groove for receiving an elongated support member and an attachment mechanism for removably attaching the sensor housing to the elongated support member, wherein the attachment mechanism includes at least one magnet embedded within the sensor housing adjacent to the elongated groove, and wherein the elongated groove includes a v-shaped cross-section defined by first and second opposing sidewalls, and the at least one magnet includes a first magnet attached to the first sidewall and a second magnet attached to the second sidewall.

19. The angle measuring system of claim 18, wherein the elongated groove extends continuously across the entirety of the second face of the sensor housing.

20. The angle measuring system of claim 18, wherein the attachment mechanism comprises at least one magnet embedded in the sensor housing adjacent to the elongate groove.

21. The angle measuring system of claim 20, wherein the elongated groove includes a v-shaped cross-section defined by first and second opposing sidewalls, and the at least one magnet includes a first magnet attached to the first sidewall and a second magnet attached to the second sidewall.

22. The angle measuring system of claim 18, further comprising a memory disposed within the sensor housing and electrically connected to the sensor processor, the memory storing logic that is executable by the sensor processor for calculating an angle of the sensor housing relative to a reference position.

23. The angle measuring system of claim 18, wherein the at least one gyrometer includes a second gyrometer axis extending perpendicular to the first gyrometer axis.

24. The angle measuring system of claim 18, further comprising an alarm carried by one of the sensor housing or the display housing for emitting an alarm signal upon the sensor housing occupying a preset angle relative to the reference position.

25. A crankshaft degree tooling system for determining at least one of top piston top dead center, cam centerline, or cam duration, the system comprising:

a crankshaft bracket comprising a head plate portion and a stem plate portion, the head plate portion for engaging a crankshaft of an internal combustion engine and having a central axis around which the crankshaft bracket rotates during use, the stem plate portion extending radially outward from a perimeter of the head plate portion along a longitudinal axis that is perpendicular to the central axis;

a digital angle meter removably attached to the stem plate portion, the digital angle meter comprising a housing, a processor, and at least one gyrometer electrically coupled to the processor, the at least one gyrometer including at least a first axis extending parallel to the longitudinal axis.

26. The crankshaft degree tooling system of claim 25, wherein the at least one gyrometer further includes a second axis extending perpendicular to the first axis.

27. The crankshaft degree tooling system of claim 25, wherein the stem plate portion is a metallic material and the digital angle meter includes at least one magnet removably attaching the digital angle meter to the stem plate portion.

28. The crankshaft degree tooling system of claim 25, wherein the housing of the digital angle meter defines an elongated groove, in which the at least one magnet is fixed.

29. The crankshaft degree tooling system of claim 28, wherein the stem plate portion of the crankshaft bracket includes an elongated protrusion extending from a face thereof, the elongated protrusion removably received within the elongated groove of the digital angle meter.

30. The crankshaft degree tooling system of claim 28, wherein the elongated groove includes a v-shaped cross-section defined by first and second opposing sidewalls, and the at least one magnet includes a first magnet attached to the first sidewall and a second magnet attached to the second sidewall.

31. The crankshaft degree tooling system of claim 25, wherein the digital angle meter further includes a memory and logic stored in the memory, the logic executable by the processor for calculating an angle of the crankshaft bracket relative to a reference position.

32. The crankshaft degree tooling system of claim 31, further comprising a digital display communicatively coupled to the processor, the display for displaying the angle of the crankshaft bracket relative to the reference position.

33. The crankshaft degree tooling system of claim 32, further comprising an alarm communicatively coupled to the processor for emitting an alarm signal upon the crankshaft bracket occupying a preset angle relative to the reference position.

34. The crankshaft degree tooling system of claim 25, wherein the head plate portion and the stem plate portion are constructed as a single piece of metallic material.

35. A method of measuring top dead center, cam profile centerline, or cam profile duration of a crankshaft of an internal combustion engine, the method comprising:

attaching a bracket to the crankshaft of the engine, the bracket initially occupying a reference position;

attaching a digital angle meter to the bracket, the digital angle meter including at least one gyrometer, a processor, a memory, and logic stored on the memory;

rotating the crankshaft of the engine and the bracket in a first direction into a first desired position;

determining an angle of rotation of the bracket relative to the reference position with the at least one gyrometer, while rotating the bracket in the first direction;

storing a first angle representative of the angle of rotation of the crankshaft and bracket in the first desired position;

rotating the crankshaft of the engine and the bracket in a second direction opposite the first direction and into a second desired position;

determining an angle of rotation of the bracket relative to the reference position with the at least one gyrometer, while rotating the bracket in the second direction;

storing a second angle representative of the angle of rotation of the crankshaft and bracket in the second desired position; and executing the logic with the processor to automatically calculate one of top dead center, cam profile center line, and cam profile duration based on the first and second angles.

36. The method of claim 35, further comprising receiving input from a user upon reaching the first and second desired positions to initiate the storing of the first and second angles.

37. The method of claim 35, further comprising displaying the angle of rotation as the crankshaft and bracket are rotated in the first and second directions.

38. The method of claim 35, wherein rotating the crankshaft and bracket includes rotating the crankshaft and bracket about a central axis of the crankshaft and wherein determining the angle of rotation of the bracket relative to the reference position with the at least one gyrometer includes determining the angle of a gyrometer axis that extends transverse to the central axis of the crankshaft.

* * * * *